(12) United States Patent
Misawa

(10) Patent No.: US 7,738,785 B2
(45) Date of Patent: Jun. 15, 2010

(54) CAMERA

(75) Inventor: Atsushi Misawa, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 252 days.

(21) Appl. No.: 11/594,762

(22) Filed: Nov. 9, 2006

(65) Prior Publication Data

US 2007/0104477 A1    May 10, 2007

(30) Foreign Application Priority Data

Nov. 9, 2005    (JP)  ............... 2005-325374

(51) Int. Cl.
*G03B 17/00* (2006.01)

(52) U.S. Cl. ............... 396/299; 396/439; 396/535; 396/541; 348/373; 348/374; 348/375

(58) Field of Classification Search ............... 396/299, 396/448, 535, 541, 297, 540, 287
See application file for complete search history.

(56) References Cited

U.S. PATENT DOCUMENTS

| | | | |
|---|---|---|---|
| 6,137,960 A | | 10/2000 | Komatsuzaki |
| 6,222,538 B1 * | | 4/2001 | Anderson ............ 715/709 |
| 6,322,259 B1 * | | 11/2001 | Miyamoto et al. .......... 396/448 |
| 6,456,795 B1 * | | 9/2002 | Nagahata et al. ............ 396/121 |
| 7,239,806 B2 * | | 7/2007 | Chen .......................... 396/301 |
| 2003/0049030 A1 * | | 3/2003 | McIntyre et al. ............ 396/448 |
| 2003/0142971 A1 * | | 7/2003 | Nishiwaki et al. ........... 396/176 |
| 2006/0051083 A1 * | | 3/2006 | Yamamoto ................... 396/287 |
| 2006/0078324 A1 * | | 4/2006 | Yasuda et al. ............... 396/299 |
| 2007/0273786 A1 * | | 11/2007 | Ahn et al. .................... 348/373 |

FOREIGN PATENT DOCUMENTS

| EP | 0 963 100 A1 | 12/1999 |
|---|---|---|
| EP | 1 542 435 A | 6/2005 |
| JP | 10065943 A | 3/1998 |
| JP | 11-298773 A | 10/1999 |
| JP | 2001197344 A | 7/2001 |

OTHER PUBLICATIONS

Machine Translation of KR 10-2006-0047638.*
Machine translation of JP 10-065943 A.*

* cited by examiner

*Primary Examiner*—W. B. Perkey
*Assistant Examiner*—Linda B Smith
(74) *Attorney, Agent, or Firm*—Sughrue Mion, PLLC

(57) ABSTRACT

A camera with a first assembly and a second assembly. The second assembly is moveably provided on the first assembly and is movable between a first position at which operation members are covered and a second position at which the operation members are exposed.

15 Claims, 12 Drawing Sheets

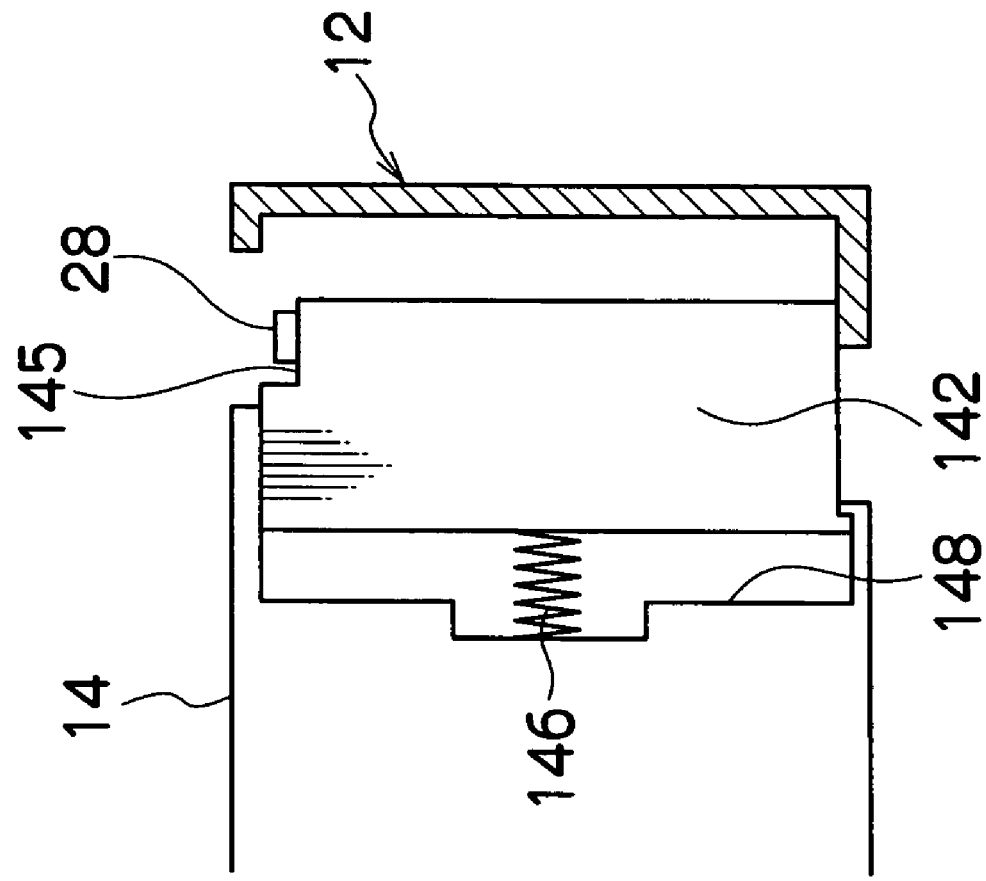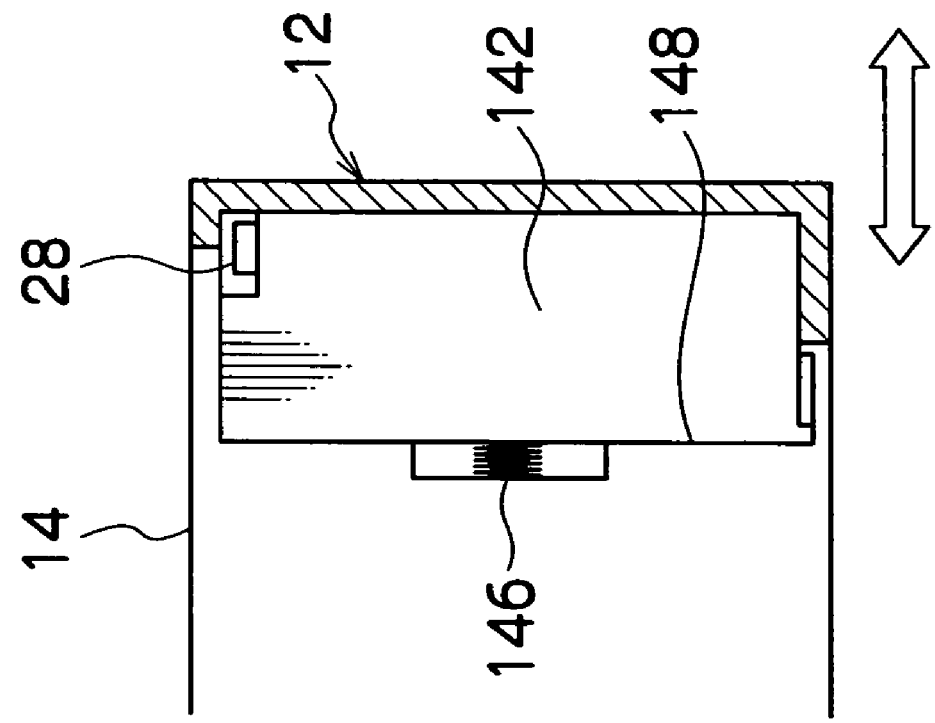

CAMERA

BACKGROUND OF THE INVENTION

1. Field of the Invention

The present invention relates to a camera, and more particularly, to a digital camera equipped with a large-screen display section and suitable for photography and playback of images.

2. Description of the Related Art

In digital cameras provided with display sections such as liquid crystal monitors, the increase in size of display sections has created conflicting issues of improvement in gripability of such digital cameras and downsizing of the camera main bodies. In other words, in a digital camera equipped with a large-screen display section, only a grip portion of the camera main body must be enlarged in order to enhance gripability. Additionally, in light of the increased size in display screens, various innovations have been made on digital cameras in order to protect their display screens from scratches or stains. For instance, a digital camera with a built-in cover member for protecting a display screen is disclosed in Japanese Patent Application Laid-Open No. 11-298773.

In this digital camera, a cover member is provided on the camera main body so as to be slidable. When the camera is not in use, the cover member is pushed back into the camera main body to be housed therein, and moves to a position which partially or entirely covers the display screen to provide protection thereof. In addition, by pulling out the cover member from the camera main body when using the camera, the entire display screen becomes exposed, and at the same time, the cover member moves to the side of the camera main body to be used as a grip portion, thereby enhancing gripability. Furthermore, the disclosure of Japanese Patent Application Laid-Open No. 11-298773 includes a description of the cover member doubling as a main power switch of the camera, and the main power turned on when the cover member is pulled out. Moreover, the disclosure of Japanese Patent Application Laid-Open No. 11-298773 includes a playback mode for reading out image data stored in a storage section to display the images on a liquid crystal monitor.

A large number of photography operation buttons to be operated during a photography mode are arranged on a camera main body of a typical digital camera. Keeping such photography operation buttons visible to a user even during a playback mode which does not require operating these buttons may cause erroneous operations, and therefore was not necessary a preferred arrangement as far as operability and handleability were concerned.

However, the digital camera disclosed in Japanese Patent Application Laid-Open No. 11-298773 does not discuss any means of improving the above-mentioned operability, and additionally, has a problem in that the overall size of the digital camera becomes larger when used as an image playback device during the playback mode.

The present invention was made in consideration of such circumstances, and its object is to achieve downsizing of a camera main body in a camera equipped with a large-screen display section, and to provide a camera capable of improving operability and gripability during photography and image playback.

SUMMARY OF THE INVENTION

In order to achieve the above objects, the invention according to a first aspect is a camera equipped with a photographic lens, a display section and operation members on a first assembly thereof, characterized in that a second assembly is movably provided on the first assembly and is configured to be movable between a first position at which the operation members are covered and a second position at which the operation members are exposed.

According to the invention of the first aspect, the second assembly provided on the first assembly is moved to the first position at which the operation members are covered when there is no need to operate the operation members, and is moved to the second position at which the operation members are exposed when there is a need to operate the operation members. Therefore, since the operation members will be hidden by the second assembly when there is no need to operate the operation members, operability and handleability for the user will be enhanced.

The invention according to a second aspect is the invention according to the first aspect, characterized in that the operation members are photography operation members to be operated during photography.

According to the second aspect, since the operation members such as a zoom adjustment member and the like will be exposed by moving the second assembly to the second position, photography operations will be enabled. In addition, since the second assembly may be utilized as a grip portion by arranging the second assembly to protrude to the side of the first assembly, downsizing of the first assembly in a camera with a large-screen display section may be achieved, and at the same time gripability may be improved. In a preferable configuration, the main power is turned on by high-speed activation and the mode is switched to a photography mode when the second assembly is moved to the second position. On the other hand, in a preferable configuration, the mode is switched to an image playback mode when the second assembly is moved to the first position. During the image playback mode, since the operation members for photography are hidden by the second assembly, operability is improved while the risks of erroneous operations are eliminated, and at the same time, a stylish equipment design is achieved.

The invention according to a third aspect is the invention according to the first or second aspect, characterized in that the front face of the photographic lens is covered by the second assembly when the second assembly is at the first position, while the front face of the photographic lens is exposed when the second assembly is at the second position.

According to the invention of the third aspect, since the second assembly is capable of completely hiding the photographic lens during the image playback mode in which the second assembly hides the operation members, or, in other words, when the camera is used as an image playback device during image playback, the photographic lens may be protected during use of the camera as an image playback device, and at the same time, a stylish equipment design is achieved.

The invention according to a fourth aspect is the invention according to the first, second or third aspect, characterized in that the photography button provided on the first assembly is covered by the second assembly when the second assembly is at the first position, while the photography button is exposed when the second assembly is at the second position.

According to the invention of the fourth aspect, since the second assembly also hides the photography button and therefore completely hides the operation members regarding photography when the second assembly is at the first position, a stylish equipment design is achieved.

The invention according to a fifth aspect is the invention according to the first, second, third or fourth aspect, characterized in that image playback operation members to be operated during image playback are provided at a position which will not be covered by the second assembly.

According to the invention of the fifth aspect, by providing the image playback operation members for instructing image playback start, image switching or fast forward, rewind, pause, frame advance and the like at a position which will not be covered by the second assembly, operations during image playback may be performed without any difficulty.

The invention according to a sixth aspect is the invention according to the fifth aspect, characterized in that operation contents of the image playback operation members are switched to different contents when the second assembly is at the second position.

According to the invention of the sixth aspect, when the second assembly is at the second position at which the operation members are exposed, the image playback operation members are switched to, for instance, photography operation members to be operated together with the exposed operation members. Since this allows minimization of the number of operation members, a stylish equipment design is achieved.

The invention according to a seventh aspect is the invention according to the second or fifth aspect, characterized in that the camera mode is switched to an image playback mode when the second assembly moves to the first position, and the camera mode is switched to a photography mode when the second assembly moves to the second position.

According to the invention of the seventh aspect, the camera mode is switched to the image playback mode when the second assembly moves to the first position, and the camera mode is switched to the photography mode when the second assembly moves to the second position. By arranging the modes to be automatically switched by simple moving operations of the second assembly, improvement of operability may be achieved as compared to a case in which a separate mode switching device is provided.

The invention according to an eighth aspect is a camera comprising a first assembly provided with a display section and a second assembly provided with a grip portion, the first assembly and the second assembly attached so as to be mutually slidable and arranged to shorten the horizontal width of the camera when slidingly moved towards each other in a housed mode and lengthen the horizontal width of the camera when slidingly moved away from each other in a deployed mode, the camera further comprising: a lens section and an operation section which are covered by the second assembly when housed and are exposed when deployed, wherein the lens section is arranged so as to be exposed to the right side of the camera as seen from the front of the camera, and the operation section is arranged so as to be exposed to the grip portion at the right side of the display section on the rear face of the camera, as seen from the rear of the camera, in conjunction with a sliding movement from a housed mode to a deployed mode.

The invention according to a ninth aspect is a camera comprising a first assembly provided with a display section and a lens section, and a second assembly provided with a grip portion, the first assembly and the second assembly attached so as to be mutually slidable and arranged to shorten the horizontal width of the camera when slidingly moved towards each other in a housed mode and lengthen the horizontal width of the camera when slidingly moved away from each other in a deployed mode, wherein, when housed, a front face of the lens section is covered by the second assembly, and when deployed, the lens section is exposed and the width of a grip portion at the right side of the display section, as seen from the rear of the camera, is expanded.

The invention according to a tenth aspect is a camera having a horizontally long display section on a rear face, the camera comprising: a first assembly provided with a display section and a lens section; a second assembly provided with a grip portion; and an operation section including operation switches, provided on a rear face-side of the camera, wherein the first assembly and the second assembly are attached so as to be mutually slidable, the lens section is covered by the second assembly when housed during which the first assembly and the second assembly have been slidingly moved towards each other, and the lens section is exposed to the right side of the camera, as seen from the front of the camera, when deployed during which the first assembly and the second assembly have been slidingly moved away from each other, and the operation section is covered by the first assembly or the second assembly when housed, and is exposed to a grip portion located at the right side of the camera, as seen from the rear of the camera, when deployed.

According to the display device of the present invention, by providing the second assembly on the first assembly so as to be movable between the first position at which the operation members are covered and the second position at which the operation members are exposed, downsizing of the first assembly in the camera with the large-screen display section may be achieved, and at the same time, operability and gripability during photography/image playback may be improved.

BRIEF DESCRIPTION OF THE DRAWINGS

FIGS. 14A and 14B are explanatory diagrams of operations of the cover member of the digital camera shown in FIG. 13.

DETAILED DESCRIPTION OF THE PREFERRED EMBODIMENTS

Preferred embodiments of a camera according to the present invention will now be described with reference to the attached drawings.

Figure 1:
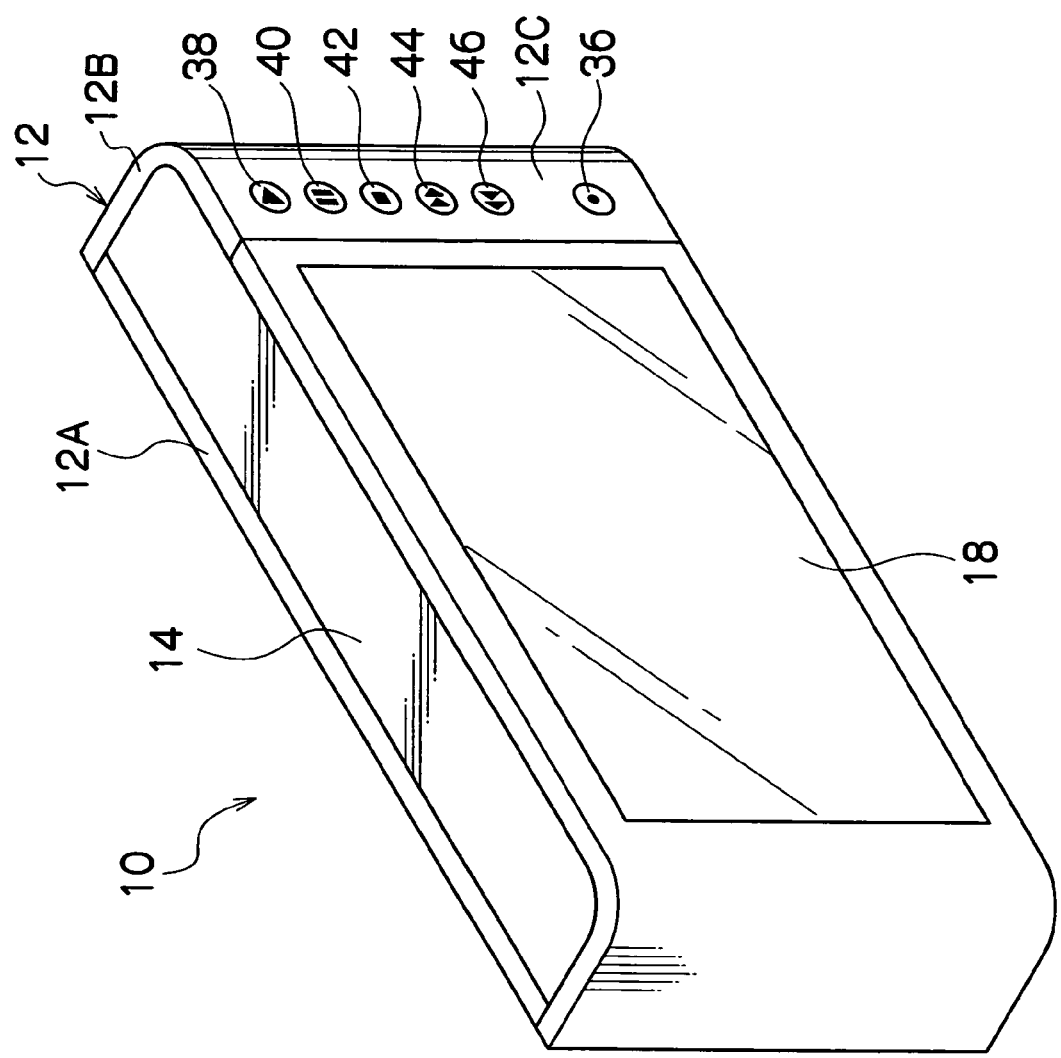
FIG. 1 is a rear perspective view of a camera main body in which a cover member is closed on the camera main body, in a digital camera according to a first embodiment.
Figure 2:
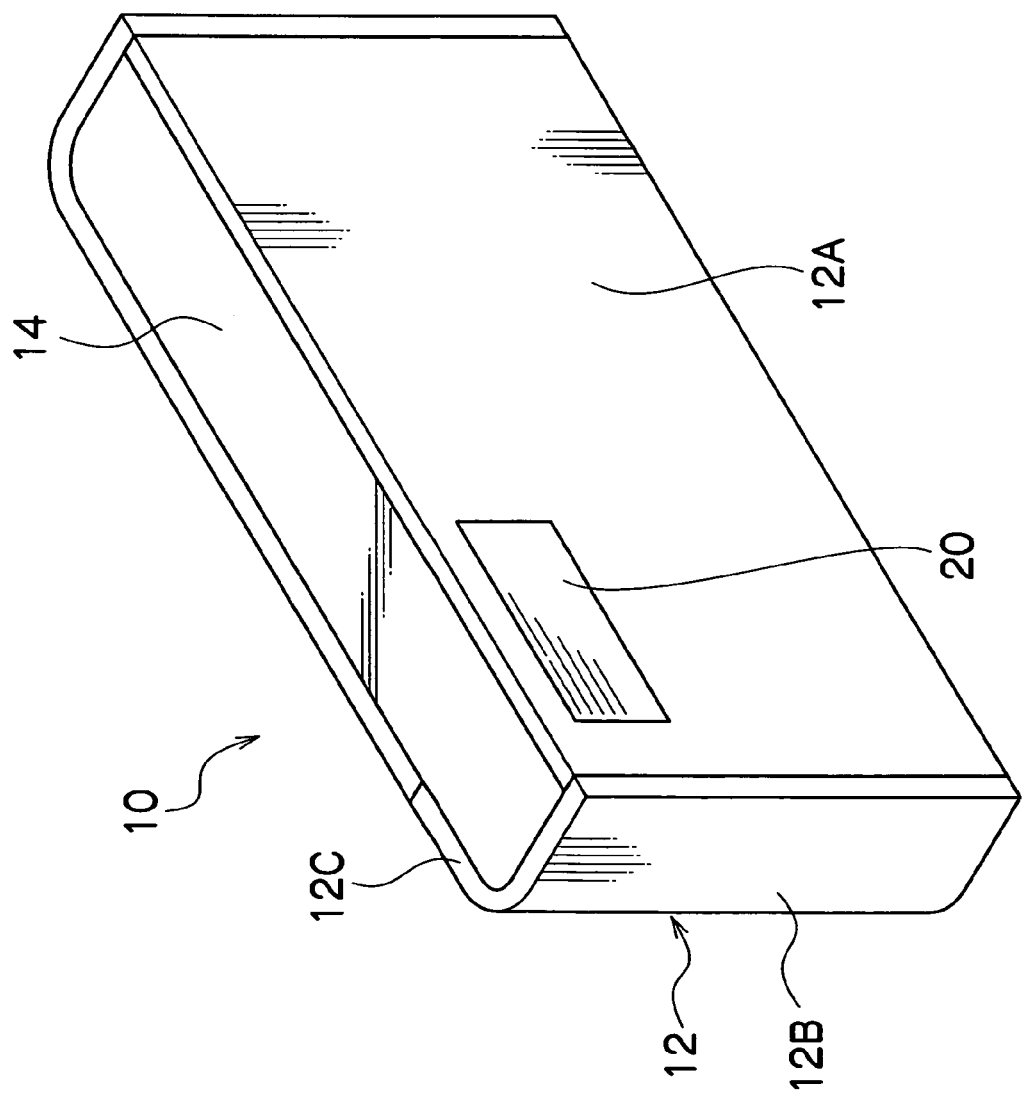
FIG. 2 is a front perspective view of the camera main body in the state shown in FIG. 1.
Figure 3:
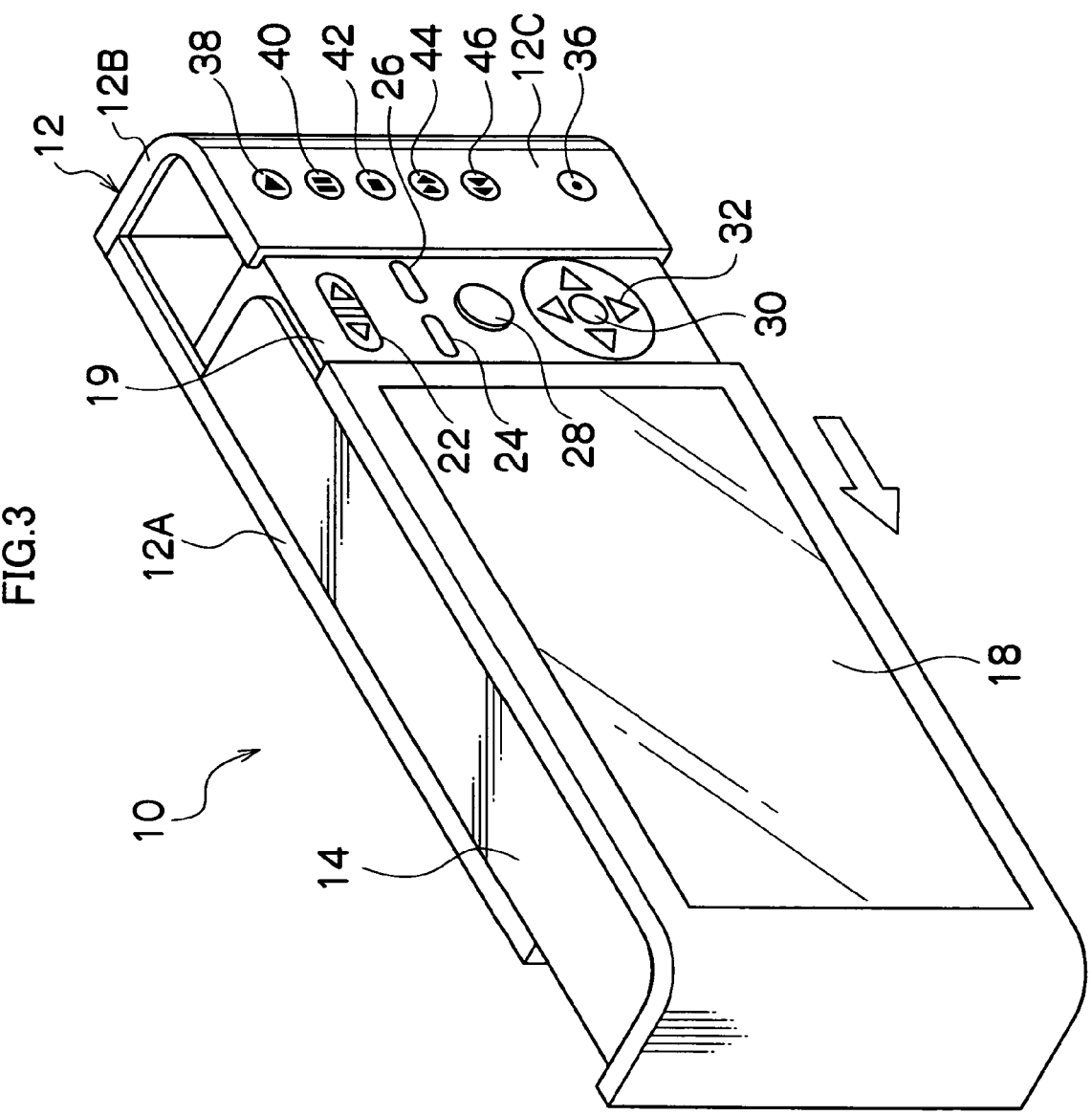
FIG. 3 is a rear perspective view of the camera main body in a state in which the cover member is opened.
Figure 4:
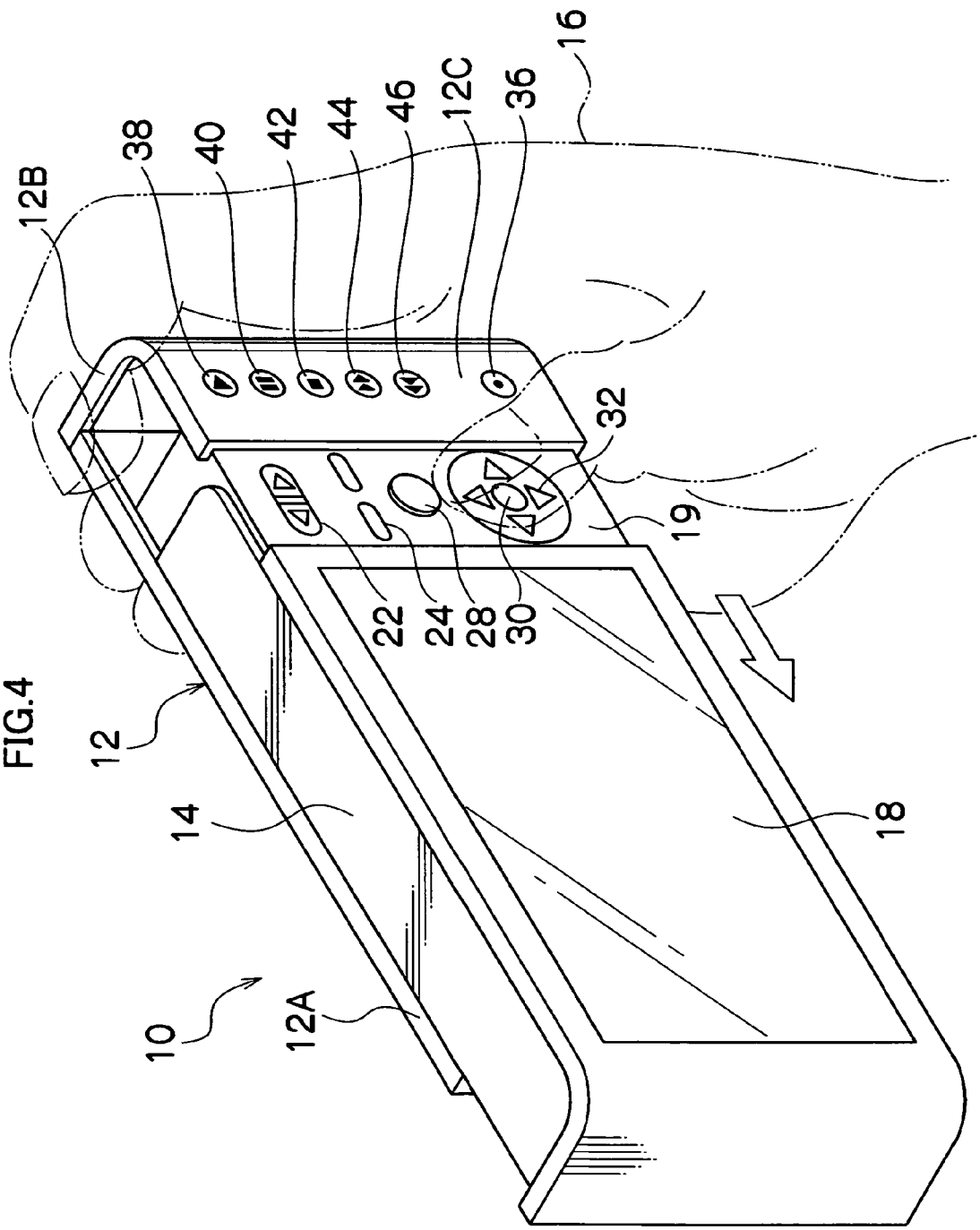
FIG. 4 is an explanatory diagram depicting a state in which a user is operating the digital camera with his/her right hand.
Figure 5:
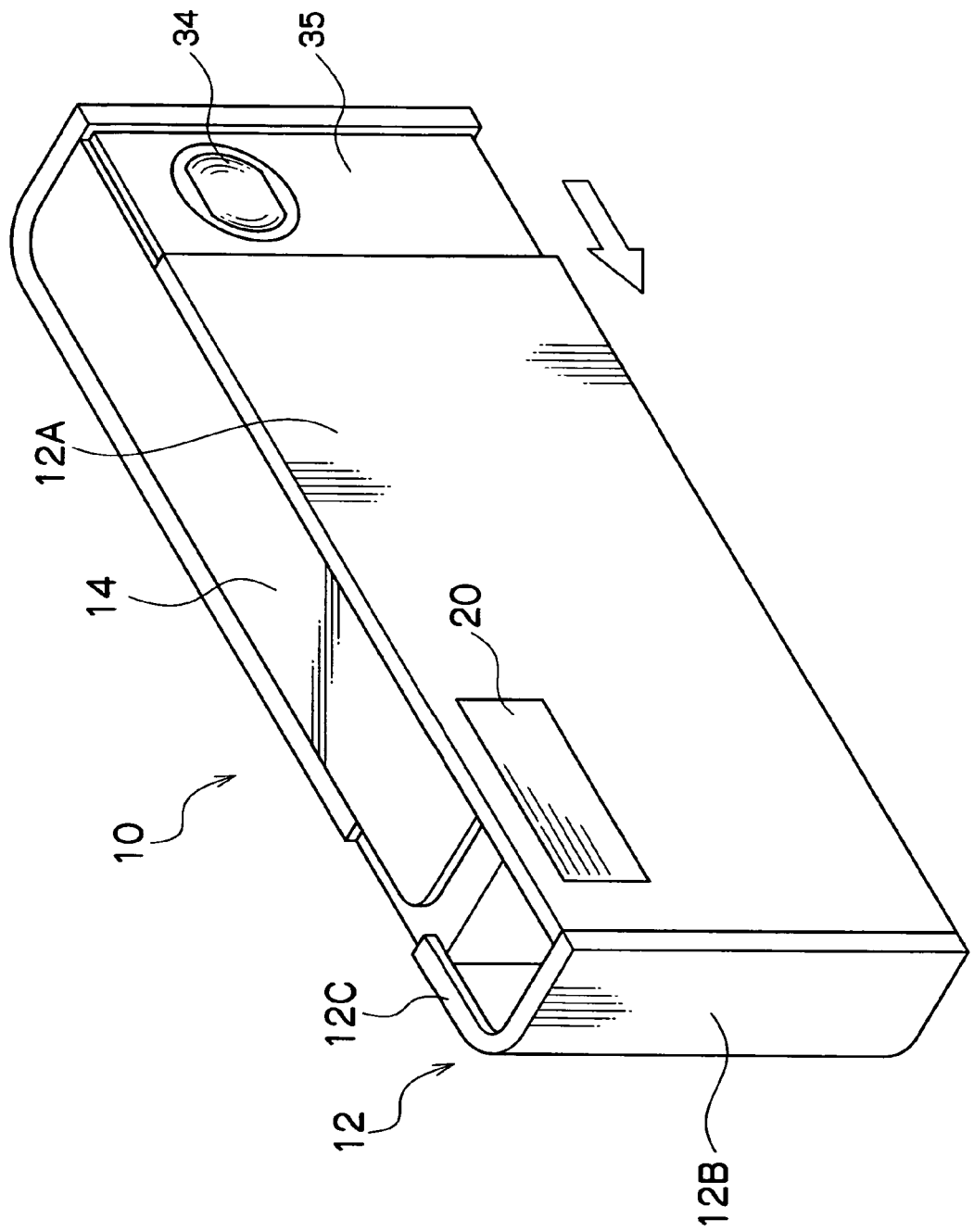
FIG. 5 is a longitudinal sectional view of an optical system when the digital camera shown in FIG. 1 is not in use.

FIG. 1 is a rear perspective view of a camera main body 14 (corresponding to a first assembly) in a stored state in which a cover member 12 (corresponding to a second assembly) is closed (first position) on the camera main body 14 in a digital camera 10 according to a first embodiment, while FIG. 2 is a front perspective view of the camera main body 14 in the state shown in FIG. 1. In addition, FIG. 3 is a rear perspective view of the camera main body 14 in a developed state in which the cover member 12 is opened (second position), while FIG. 4 is an explanatory diagram depicting a state in which a user is operating the digital camera 10 with his/her right hand 16 which is indicated by a double-dotted dashed line, in the state shown in FIG. 3. FIG. 4 further indicates that the cover member 12 is gripped by the right hand 16 and therefore doubles as a grip section. FIG. 5 is a front perspective view of the camera main body 14 in the state shown in FIG. 3.

The main body 14 of the digital camera 10 has an exterior appearance of an approximate cuboid that is flattened in the direction of thickness, and has a horizontally long shape that is long in the direction of width in relation to the length of the cover member 12 in its direction of height. In addition, a liquid crystal monitor 18 shown in FIG. 1 is a screen with an aspect ratio of 9:16, and the size of the mounted screen is arranged to be as large as possible in relation to the rear face of the camera main body 14 in a horizontal state in which the cover member 12 is closed, as shown in FIG. 1.

The cover member 12 is composed of a front face section 12A, a side face section 12B, and a rear face section 12C. The front face section 12A is formed in a rectangular shape so as to cover the entire front face of the camera main body 14, and is fixed to the camera main body 14 by engaging a slide guide section, not shown, provided on the front face of the camera main body 14 so as to be slidable in a horizontal direction in regards to the camera main body 14. A strobe section 20 comprising a xenon tube is positioned at a upper left corner of the front face section 12A, as seen from the front thereof as shown in FIG. 2.

The side face section 12B of the cover member 12 is connected to the front face section 12A and is integrally formed with the rear face section 12C. In addition, the side face section 12B is formed to cover the right side face of the camera main body 14 as seen on FIG. 1, while the rear face section 12C is a rear face of the camera main body 14 as shown on FIG. 1, and is formed to cover the right side portion of the liquid crystal monitor 18.

When the cover member 12 slides rightward as seen in FIG. 3 and moves to an open position (second position), a group of various buttons for photography operations (photography operation members), until then hidden by the rear face section 12C of the cover member 12, becomes exposed to the right side when viewed from the rear of the digital camera 10. The group of various buttons is positioned in a rectangular-shaped depressed face section 19 formed to the right-hand side of the liquid crystal monitor 18 of the camera main body 14, and comprises, from top to bottom: a zoom button 22, a playback button 24, a photo-mode button 26, a photography button 28, a menu/OK button 30, and a cross-shaped button 32.

The zoom button 22 is operated when adjusting focal length to a tele-side or a wide-side. The playback button 24 is operated when immediate playback of a photographed image is desired. Unlike the playback button operated during an image playback mode, the playback button 24 is a button operated during a photography mode, and is operated when immediate verification of the photographic status of a photographed image of a subject is desired. In addition, the photo-mode button 26 is a button for switching between color photography and black and white photography.

The photography button 28 is half-pressed and fully-pressed by the thumb of the right hand 16 of the user, which is gripping the cover member 12 which doubles as a grip section, as shown in FIG. 4. Focus adjustment is performed during a half-pressed operation, while a subsequent fully-pressed operation causes a subject image to be formed on a color image capturing element 70 (refer to FIG. 6) via a photographic lens 34, as shown in FIG. 5. The menu/OK button 30 is an operation button which functions both as a menu button for issuing instructions to display a menu on the screen of the liquid crystal monitor 18, and as an OK button for instructing finalization and execution or the like of selected contents. The cross-shaped button 32 is provided so as to be inclinable in the four directions of upward, downward, leftward and rightward, and is used as an operation key for selecting various setting items and for instructing changes to set contents and to erase recorded images. It is obvious that the depressed face section 19 also serves as a grip portion. Therefore, when deployed, a grip portion comprised of the cover member 12 and the depressed face section 19 is enlarged.

With the digital camera 10 of the present embodiment, opening of the cover member 12 is detected by a switching device 13 (refer to FIG. 6) as soon as the cover member 12 is opened, and the main power of the digital camera 10 is turned on. In addition, when the cover member 12 is closed as shown in FIG. 1, the group of various buttons for photography operations is hidden by the cover member 12, and the switching device 13 detects that the cover member 12 has been closed to turn off the main power of the digital camera 10. On the other hand, when using the digital camera 10 as an image playback device for performing image playback, a power switch 36 provided at a lower portion of the rear face section 12C of the cover member 12 is operated while the cover member 12 is closed to turn on the main power of the image playback device. This switches the mode of the digital camera 10 to the image playback mode. Furthermore, image playback operation members used when the mode is switched to the image playback mode, or, in other words, an image playback start button 38, a pause button 40, a stop button 42, a fast forward button 44, and a rewind button 46 are aligned in a longitudinal direction on the rear face section 12C of the cover member 12. While the image playback operation members described above function during the image playback mode as function buttons related to playback such as commencement of image playback and the like, operation contents of the operation members are switched to different contents during the photography mode and the members are assigned to operation buttons related to photography such as for increasing or reducing sensitivity.

When the cover member 12 slides rightward as seen in FIG. 4 and moves to its open position, the photographing lens 34, until then hidden by the front face section 12A of the cover member 12, becomes exposed. The photographing lens 34 is provided in a rectangular-shaped depressed face section 35 formed to the right-hand side of the front face of the camera main body 14.

Figure 6:
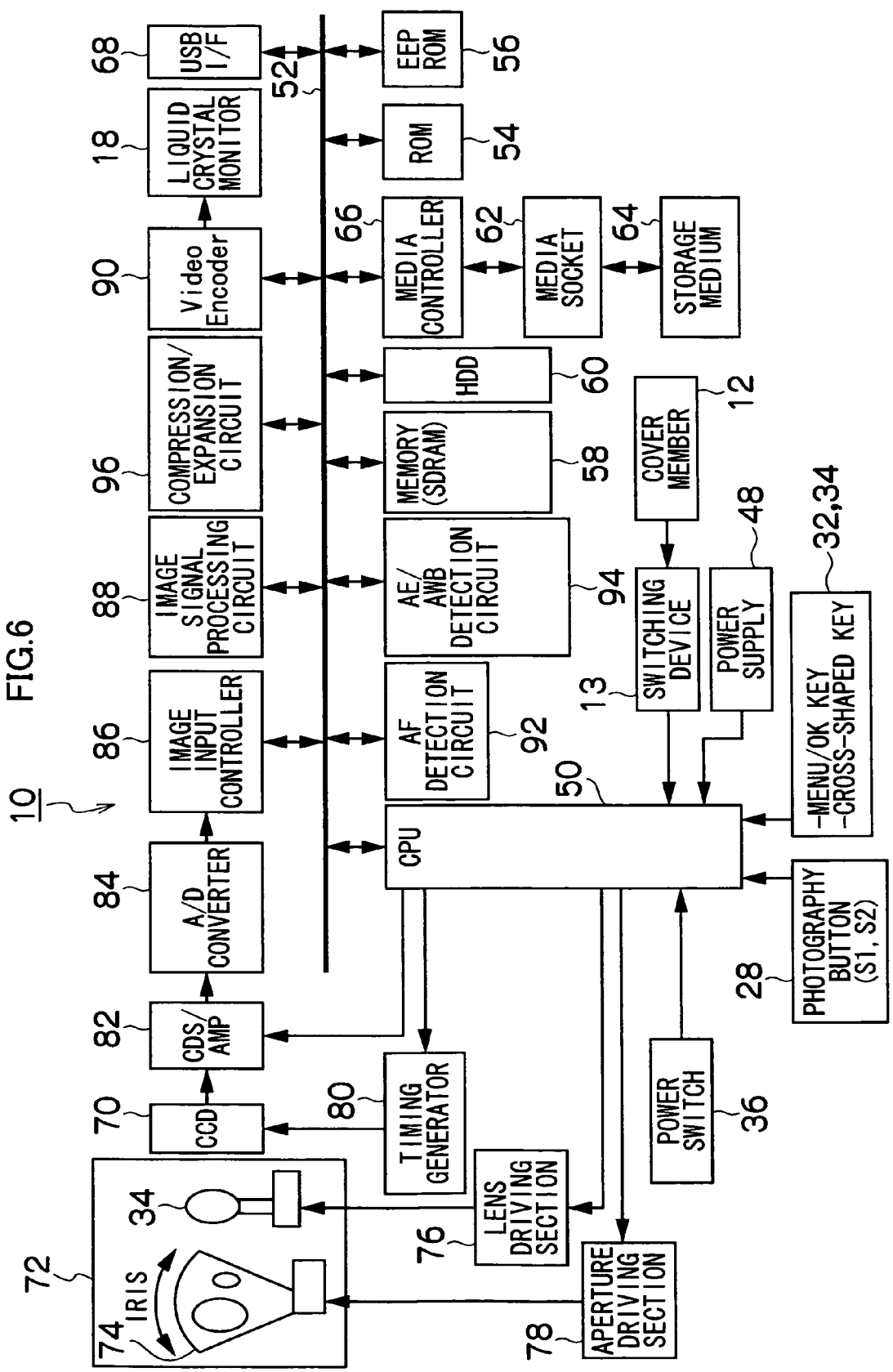
FIG. 6 is a front perspective view of the camera main body in the state shown in FIG. 3.

FIG. 6 is a block diagram of the camera 10.

When the switching device 13 detects that the cover member 12 is opened, power from a power source 48 is applied to a CPU 50 which is a system control circuit section to turn on the main power and to switch the mode to the photography mode. In addition, in the event that the switching device 13 detects that the cover member 12 is closed, when the power switch 36 is turned on, power from the power source 48 is applied to the CPU 50 to turn on the main power and to automatically switch to the image playback mode.

The CPU (central processing unit) 50 integrally controls the entire operation of the digital camera 10. The CPU 50 functions both as a system control circuit section which controls the camera system according to a predetermined program, and as a computation device which executes various computations including automatic exposure (AE) computation, automatic focus adjustment (AF) computation, white balance (WB) adjustment computation and the like.

Programs executed by the CPU 50 and various data or the like necessary for control are stored in a ROM 54 connected to the CPU 50 via a bus 52. An EEPROM 56 stores CCD pixel defect information and various constants/information and the like regarding camera operation.

In addition, a memory (SDRAM) 58 is used both as a deployment area for programs and a computation work area of the CPU 50, and as a temporary storage area for image data and audio data. A storage section (HDD) 60 is a temporary storage memory used exclusively for storing image data, and is erasable through operations of the cross-shaped button 32 of the digital camera 10.

The photography button 28 is an operation button for inputting instructions to commence photography, and is configured as a two-stage stroke switch having a S1 switch which is activated upon half-pressing, and a S2 switch which is activated upon full-pressing.

The liquid crystal monitor 18 is also used as a user interface display screen, and displays information such as menu information, selection items and selection contents as needed. In addition, image data stored in the storage section 60 are reduced to thumbnails to be displayed on the liquid crystal monitor 18. While a liquid crystal display is used as the liquid crystal monitor 18, a display device using other systems such as organic EL may be used instead.

The digital camera 10 is equipped with a media socket 62 to which a storage medium 64 is mounted. The format of the storage medium is not particularly limited, and various media may be used, including semiconductor memory cards as typified by an xD-Picture Card (trademark) or a SmartMedia (trademark), a portable compact hard disk, a magnetic disk, an optical disk, a magneto-optic disk, and the like.

A media controller 66 performs required signal conversion in order to deliver and receive input/output signals suitable for the storage medium 64 mounted on the media socket 62.

In addition, the digital camera 10 comprises a USB interface section 68 as a communication device to provide connection to a personal computer and other external devices. Data such as image data may be received from and delivered to an external device by connecting the external device to a connector, which is a communication terminal, connected to the USB interface section 68 via a USB cable, not shown. It is obvious that communication systems are not limited to USB, and other communication systems may be applied.

Next, the photography function of the digital camera 10 will be described.

When the cover member 12 is opened and the mode is set to the photography mode, power is supplied to an image capturing section which includes a color image capturing element (hereinafter referred to as CCD) 70, and a photography-enabled state is established.

A lens tube 72 is an optical unit which includes the photographic lens 34 and a diaphragm/mechanical shutter 74. The lens tube 72 is electrically driven by a lens driving unit 76 and an aperture driving unit 78 which are controlled by the CPU 50, and performs zoom control, focus control and iris control.

Light passing through the photographic lens 34 focuses on an acceptance surface of the CCD 70. A large number of photodiodes (light receiving elements) are two-dimensionally arranged on the acceptance surface of the CCD 70, and red (R), green (G) and blue (B) primary color filters which respectively correspond to each photodiode are positioned in a predetermined array structure. In addition, the CCD 70 is equipped with an electronic shutter function which controls a charge accumulation time (shutter speed) of each photodiode. The CPU 50 controls the charge accumulation times at the CCD 70 through a timing generator 80. Image capturing elements of other systems such as a MOS-type image capturing element may be used instead of the CCD 70.

A subject image formed on the acceptance surface of the CCD 70 is converted by each photodiode into signal charges of a quantity corresponding to the amount of incident light. Signal charges accumulated in each photodiode are sequentially read out as voltage signals (image signals) corresponding to signal charges, based on a drive pulse applied by the timing generator 80 according to instructions from the CPU 50.

Signals outputted from the CCD 70 are sent to an analog processing unit (CDS/AMP) 82, where R, G, and B signals of each pixel receive sampling hold operations (correlated double sampling processing). The signals are then amplified and applied to an A/D converter 84. The dot-sequential R, G, and B signals converted into digital signals by the A/D converter 84 are stored in the memory 58 via an image input controller 86.

An image signal processing circuit 88 processes the R, G, and B signals stored in the memory 58 according to instructions from the CPU 50. More specifically, the image signal processing circuit 88 functions as an image processing device comprising a synchronization circuit (a processing circuit which interpolates spatial discrepancies in color signals due to the color filter array of a single plate CCD to convert color signals into synchronous signals), a white balance correction circuit, a gamma correction circuit, a contour correction circuit, a luminance/color difference signal generation circuit and the like, and performs predetermined signal processing according to commands from the CPU 50 while utilizing the memory 58.

The image signal processing circuit 88 converts RGB image data inputted thereto into luminance signals and color difference signals, and also performs predetermined processing such as gamma correction. Image data processed by the image signal processing circuit 88 is stored in the storage section 60.

When outputting photographed images onto the liquid crystal monitor 18, image data is read out from the storage section 60, and is sent to a video encoder 90 via the bus 52. The video encoder 90 converts the inputted image data into signals of a predetermined system for display (such as a NTSC system color complex picture signal) and outputs the same to the liquid crystal monitor 18.

When the photography button 28 is half-pressed and S1 is switched on, the digital camera 10 commences AE and AF processing. More specifically, image signals outputted from the CCD 70 are A/D converted, and inputted into an AF detection circuit 92 and an AE/AWB detection circuit 94 via the image input controller 86.

The AE/AWB detection circuit 94 includes a circuit which splits a single screen into a plurality of areas (for instance, 16 by 16) and respectively integrates RGB signals for each split area, and provides the integrated values to the CPU 50. The CPU 50 detects brightness of the subject (subject luminance) based on the integrated values inputted from the AE/AWB detection circuit 94, and calculates an exposure value (photography EV value) suitable for photography. An aperture value and a shutter speed are determined according to the obtained exposure value and a predetermined program diagram. According to the determined aperture value and shutter speed, the CPU 50 controls an electronic shutter and an iris of the CCD 70 to obtain an appropriate exposure.

Additionally, during automatic white balance adjustment, the AE/AWB detection circuit 94 respectively calculates an average integrated value for each color of RGB signals for each split area, and provides the calculation results to the CPU 50. Once an R integrated value, a B integrated value, and a G integrated value are obtained, the CPU 50 calculates R/G and B/G ratios for each split area, performs discrimination of light source type based on distribution of the R/G and B/G values across R/G and B/G color spaces and the like, controls gain values (white balance correction values) of the white balance adjustment circuit against the R, G, and B signals based on white balance adjustment values appropriate for the discriminated light source types so that the value of each ratio is, for instance, approximately 1, and corrects signals of the respective color channels. Images which retain a certain color may be generated by adjusting the gain values of the white balance adjustment circuit so that the above-mentioned ratios assume values other than 1.

A contrast AF which moves a focusing lens (among the lens optical system comprising the photographic lens 34, a movable lens which contributes to focus adjustment) so that, for instance, a high frequency component of the G signal of the picture signal is maximum), is used as the AF control in the digital camera 10. More specifically, the AF detection circuit 92 is comprised of a bypass filter which allows passage of only high frequency components of the G signal, an absolute valuation processing section, an AF area extraction section which cuts out signals within a focus object area which is preset in the screen (for instance, at a central portion of a screen), and an integration section which integrates absolute value data within the AF area.

Data of integrated values obtained by the AF detection circuit 92 is notified to the CPU 50. The CPU 50 computes focus evaluated values (AF evaluated values) at a plurality of AF detection points while moving the focusing lens by controlling the lens driving section 76, and determines a lens position at which the evaluated value is maximum as a focal point. The CPU 50 then controls the lens driving section 76 so as to move the focusing lens to the obtained focal position. Calculation of AF evaluated values is not limited to a mode in which G signals are used, and luminance signals (Y signals) may be used instead.

The photography button 28 is half-pressed to turn on S1 to perform AE/AF processing, and the photography button 28 is full-pressed to turn on S2 to initiate photography operations for recording. Image data obtained in response to the activation of S2 is converted into a luminance/color difference signal (Y/C signal) at the image signal processing circuit 88, and is stored in the memory 58 after receiving predetermined processing such as gamma correction and the like.

Y/C signals stored in the memory 58 are compressed according to a predetermined format at a compression/expansion circuit 96, and stored in the storage medium 64 via the media controller 66. For instance, still images are stored in JPEG format.

Next, when the cover member 12 is closed and the power switch 36 is turned on, compressed data of the last image file (the file last recorded) stored in the storage medium 64 is read out. If the last recorded file is a still image file, the read-out image compressed data is expanded into a non-compressed YC signal via the compression/expansion circuit 96, converted into a display signal via the image signal processing circuit 88 and the video encoder 90, and then outputted to the liquid crystal monitor 18. Image contents of the file are hereby displayed on the screen of the liquid crystal monitor 18.

During frame-by-frame playback of still images (as well as during playback of lead frames of moving images), a playback object image may be switched to a next image file (frame advance/frame reverse) by operating the fast forward button 44 and the rewind button 46 shown in FIG. 1. An image file of a frame-advanced position is read out from the storage medium 64, and a still image or a moving image is playback-displayed on the liquid crystal monitor 18 in the same manner as described above.

Next, advantages of the digital camera 10 configured as described above will be explained.

When performing photography using the digital camera 10, the cover member 12 is opened as shown in FIGS. 3, 4 and 5 to set the camera to the photography mode. This automatically turns on the main power, while the photography button 28 and other photography operation members, until then hidden by the cover member 12, become exposed as shown in FIGS. 3 and 4, and the photographic lens 34 is exposed as shown in FIG. 5. Therefore, photography of a subject may be performed by pointing the photographic lens 34 at the subject and pressing the photography button 28.

In addition, during photography mode, since the cover member 12 protrudes towards the right-hand side of the camera main body 14 as shown in FIG. 3, the cover member 12 and the concave section 19 may be used as a grip section. Thus, downsizing of the camera main body 14 in the digital camera 10 equipped with the large-screen liquid crystal monitor 18, as well as enhanced gripability may be achieved.

When using the digital camera 10 as an image playback device, the cover member 12 is first closed as shown in FIGS. 1 and 2 and the power switch 36 is turned on. This automatically switches the mode from the photography mode to the image playback mode. Subsequently, by operating the image playback operation members such as the image playback start button 38 and the like, images stored in the memory 58, the storage section 60 or the storage medium 64 are sequentially read out and displayed on the liquid crystal monitor 18.

During image playback mode, since the photography operation members such as the photography button 28 which were exposed during the photography mode as shown in FIG. 3, are hidden by the cover member 12, the risks of erroneous operations may be eliminated and operability may be improved. In addition, since the operation members regarding photography may be completely hidden, a stylish equipment design is achieved. Furthermore, since the cover member 12 hides the photographic lens 34, or, in other words, since the existence of the photographic lens 34 may be completely hidden, a stylish equipment design is achieved, and at the same time, the photographic lens 34 may be protected during use of the camera as an image playback device.

Moreover, since the image playback operation members to be operated during image playback such as the image playback start button 38 are provided on the external surface of the cover member 12 which is a position that is not covered by the cover member 12, operations during image playback may be performed without any difficulty.

In addition, since the image playback operation members such as the image playback start button 38 which are used when the mode is switched to the image playback mode are assigned during the photography mode to operation buttons related to photography such as for increasing or reducing sensitivity, the number of operation members may be minimized and a stylish equipment design is achieved.

Furthermore, since the modes have been arranged to be automatically switched by the opening and closing operations of the cover member 12, improvement of operability may be achieved as compared to a case in which a separate mode switching device is provided.

Figure 7:
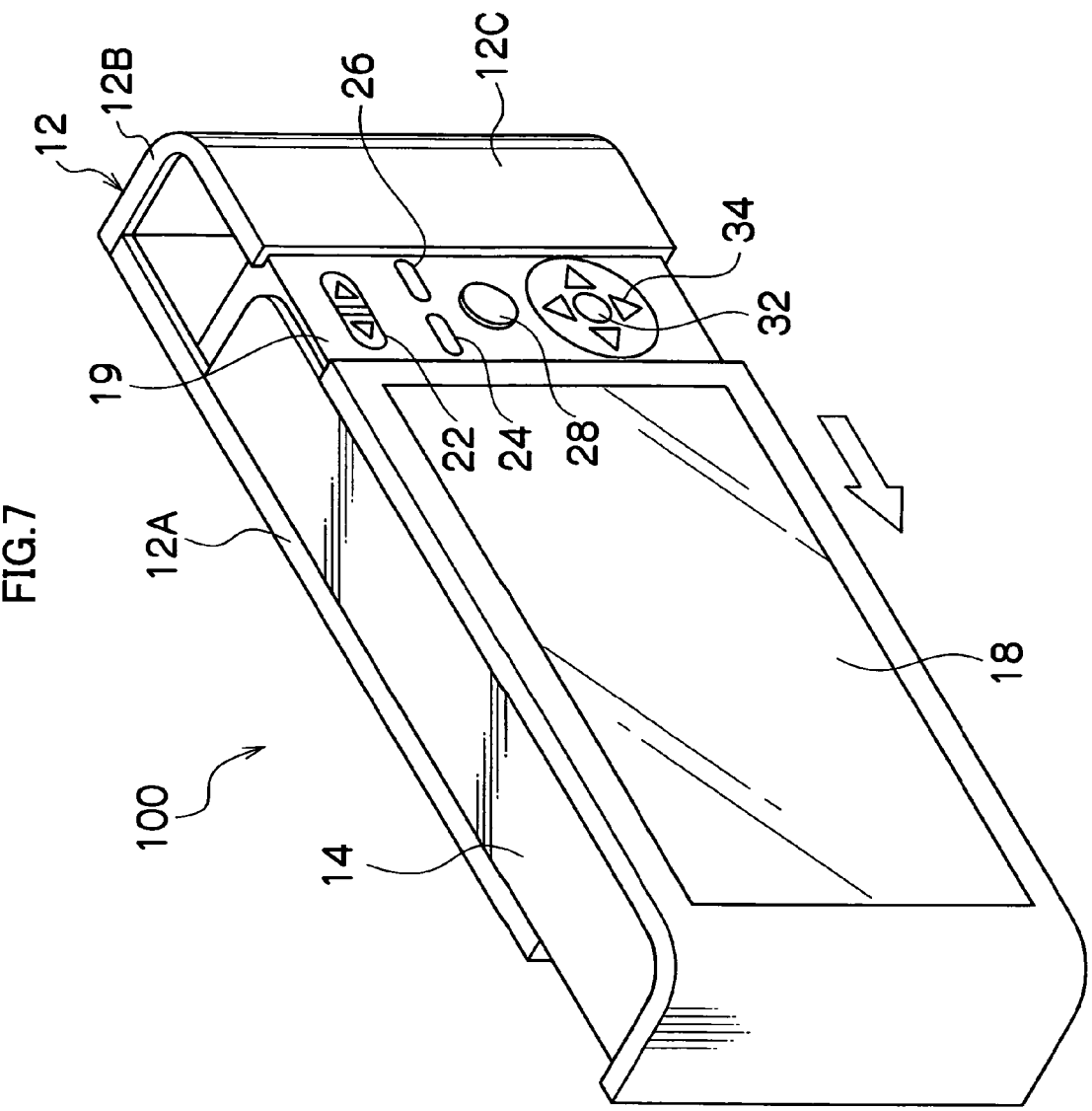
FIG. 7 is a rear perspective view of a digital camera according to a second embodiment.

FIG. 7 is a diagram showing a digital camera 100 according to a second embodiment. Same or similar parts to those used in the digital camera 10 shown in FIGS. 1 to 5 are assigned same reference numerals, and descriptions thereof will be omitted.

The digital camera 100 shown in FIG. 7 is an example of a digital camera which is not equipped with the image playback start button 38, the pause button 40, the stop button 42, the fast forward button 44, and the rewind button 46 provided on the cover member 12 of FIG. 3. According to the digital camera 100, a digital camera with a completely flat body configuration with no buttons on its exterior surface may be provided by closing a cover member 12 to hide a group of operation buttons 22, 24, 26, 32 and 34. Therefore, according to the digital camera 100, portability is improved, and from a design viewpoint, the sleeker configuration results in an improved appearance.

Figure 8:
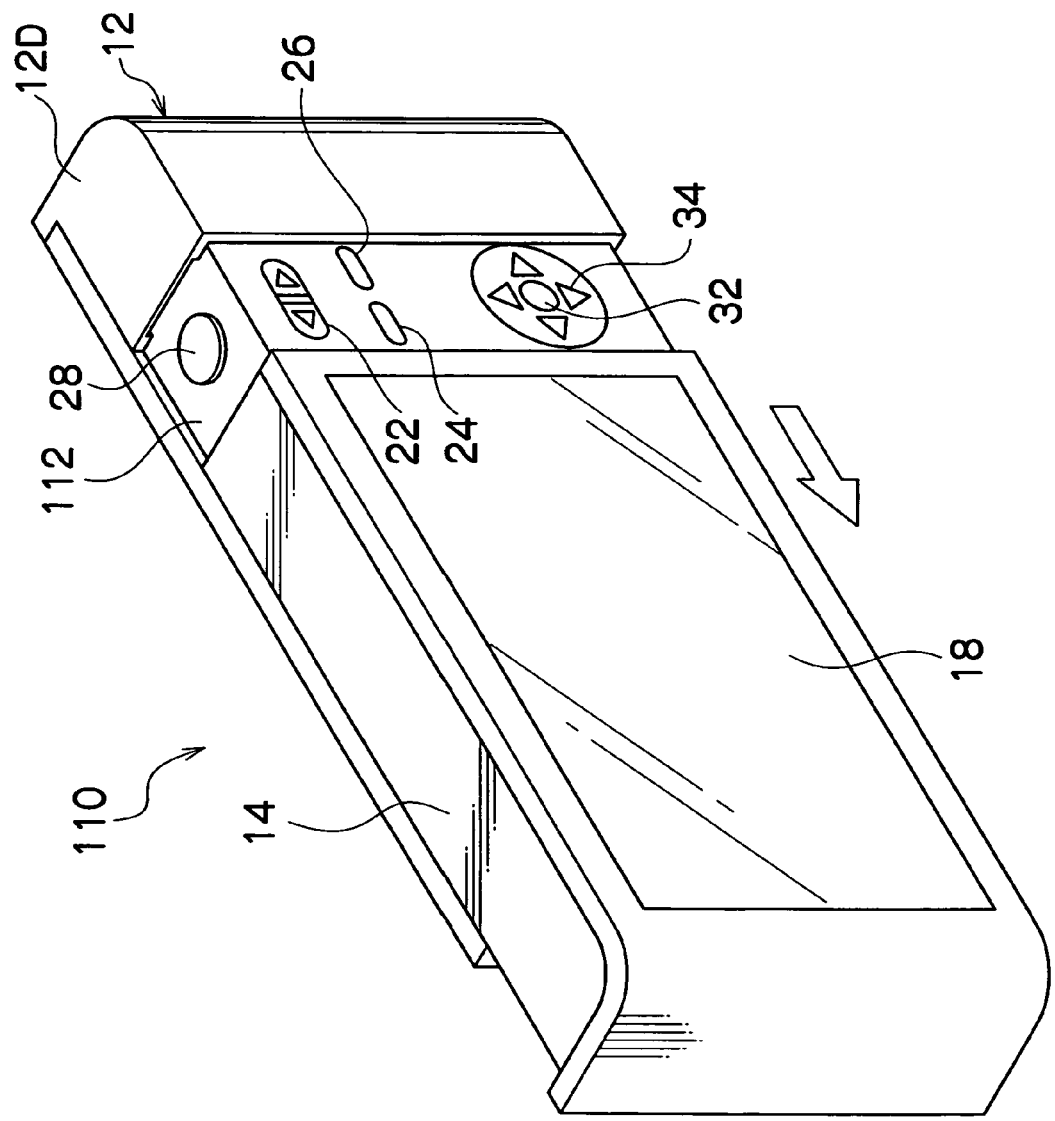
FIG. 8 is a rear perspective view of a digital camera according to a third embodiment.

FIG. 8 is a diagram showing a digital camera 110 according to a third embodiment. Same or similar parts to those used in the digital camera 10 shown in FIGS. 1 to 5 are assigned same reference numerals, and descriptions thereof will be omitted.

For the digital camera 110 of FIG. 8, a photography button 28 is arranged at a depressed face section 112 to be hidden by a top panel 12D of a cover member 12 which is an upper face of a camera main body 14. The photography button 28 may be hidden by the cover member 12 even when the photography button 28 is arranged in such a position.

Figure 9:
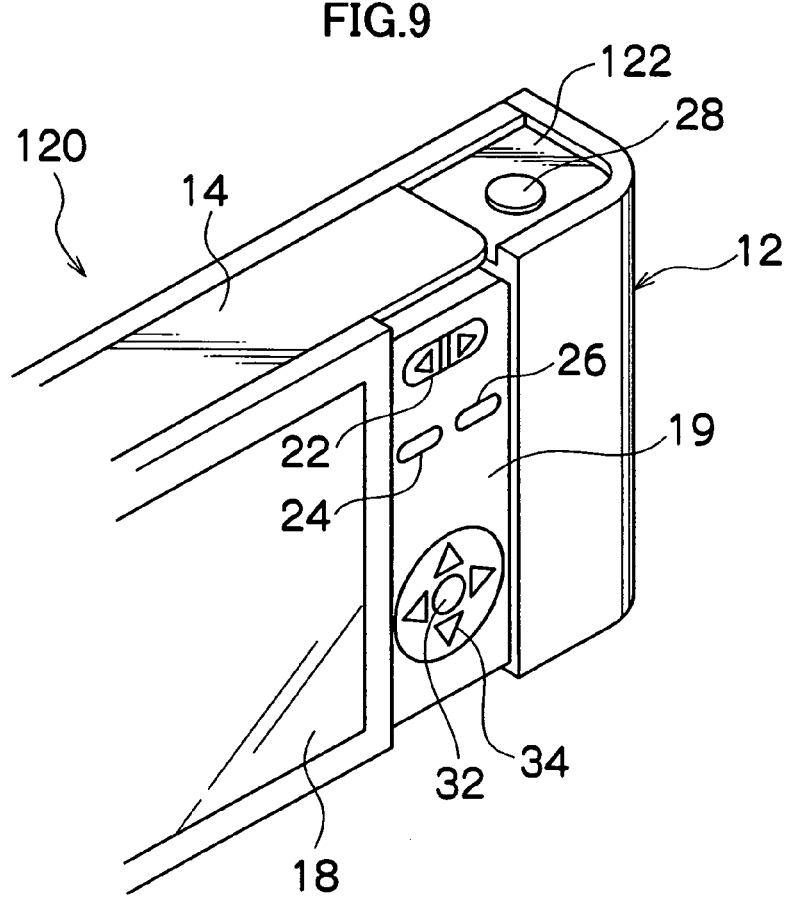
FIG. 9 is a rear perspective view of substantial portions of a digital camera according to a fourth embodiment.
Figure 10:
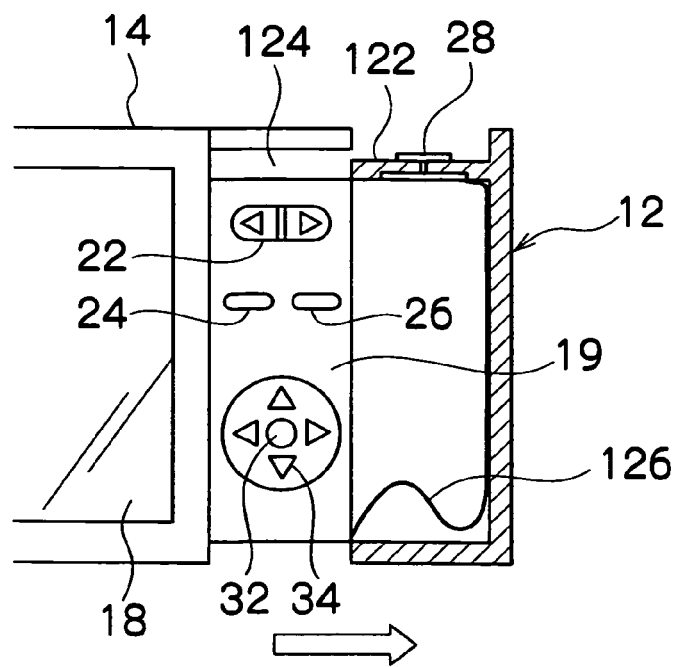
FIG. 10 is a rear view of substantial portions of the digital camera shown in FIG. 9.

FIGS. 9 and 10 are diagrams showing a digital camera 120 according to a fourth embodiment. Same or similar parts to those used in the digital camera 10 shown in FIGS. 1 to 5 are assigned same reference numerals, and descriptions thereof will be omitted.

For the digital camera 120 of FIGS. 9 and 10, a photography button 28 is arranged on a plate 122 formed on an upper portion of a cover member 12. In addition, a depressed section 124 which houses the plate 122 and the photography button 28 when the cover member 12 is closed is formed on an upper portion of a camera main body 14. In the digital camera 120 according to the present embodiment, while the photography button 28 is provided on a cover member 12 side and the depressed section 124 which hides the photography button 28 is provided on a camera main body 14 side, the digital camera 120 may also be arranged so that the photography button 28 is hidden when the cover member 12 is closed. Reference numeral 126 designates a flexible board which connects the photography button 28 to a CPU on a camera main body 14 side.

Figure 11:
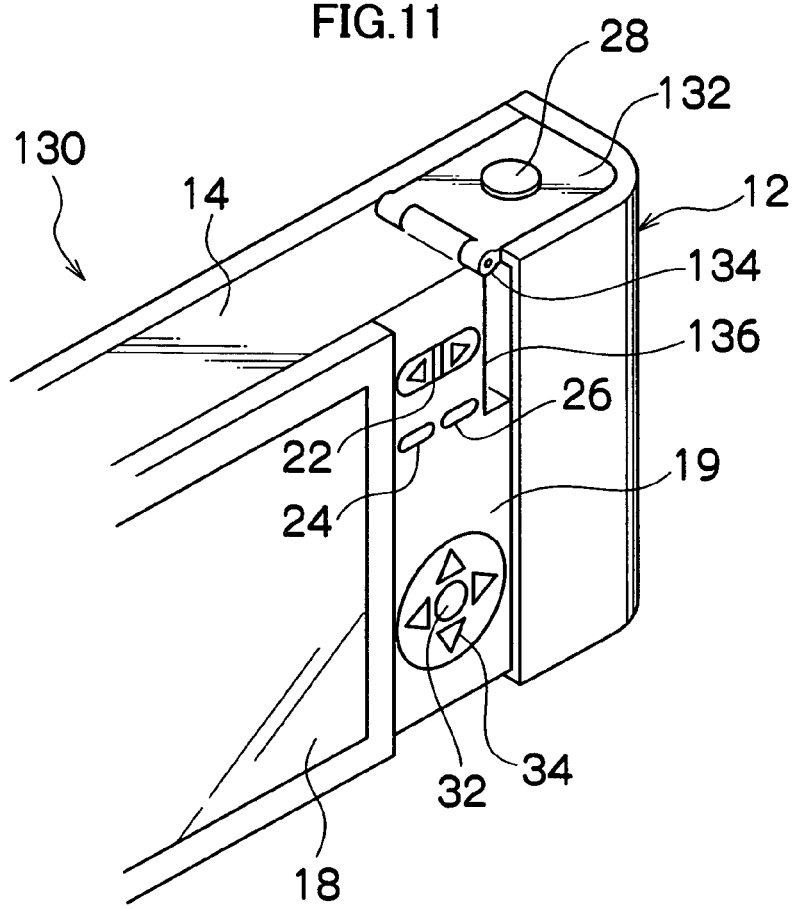
FIG. 11 is a front perspective view of substantial portions of the digital camera according to the fourth embodiment.
Figure 12:
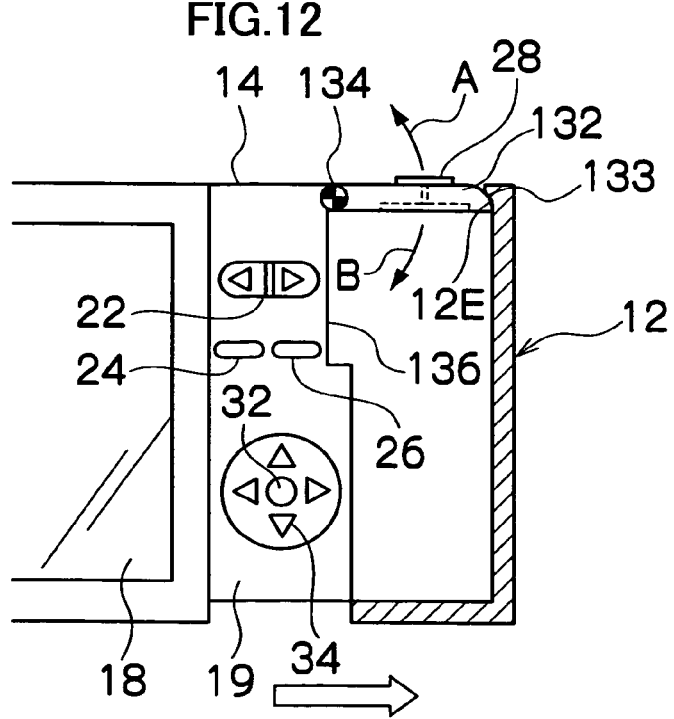
FIG. 12 is a rear view of substantial portions of the digital camera shown in FIG. 11.

FIGS. 11 and 12 are diagrams showing a digital camera 130 according to a fifth embodiment. Same or similar parts to those used in the digital camera 10 shown in FIGS. 1 to 5 are assigned same reference numerals, and descriptions thereof will be omitted.

The digital camera 130 of FIGS. 11 and 12 is configured so that a plate 132 to which a photography button 28 is fixed is provided on an upper edge of a camera main body in the vicinity of a cover member 12 so as to be rotationally movable via a shaft 134, wherein the plate 132 is urged in an open direction indicated by an arrow A of FIG. 12 by an urging force of a spring, not shown, which is engaged with the camera main body 14 and the plate 132.

Additionally, in an open state of the cover member 12 shown in FIG. 12, the rotational movement of the plate 132 is regulated by an upper edge section 133 of the plate 132, which is pressed against and urged towards a tapered stopper face 12E formed on an upper edge portion of the cover member 12. Since this allows the plate 132 to be positioned in a position shown in FIG. 11, or, in other words, at a face that is parallel to the upper face of the camera main body 14, the photography button 28 will be positioned at a position which enables easy operation.

When the cover member 12 is slid from its open position shown in FIG. 12 towards its closed position, the stopper face 12E of the cover member 12 presses against the upper edge section of the plate 132. This causes the plate 132 to rotationally move against the urging force of the afore-mentioned spring in a closing direction indicated by an arrow B in FIG. 12. When the cover member 12 is completely closed, the plate 132 will be housed in a depressed section 136 formed on a side face of the camera main body 14.

At this point, while the urging force of the afore-mentioned spring acts to apply a force in an opening direction to the cover member 12, by providing friction between the cover member 12 and the camera main body 14 sufficient to resist the urging force, hasty opening of the cover member 12 may be prevented. In addition, when closing the cover member 12, locking members such as a hook, clicking mechanism or the like for locking the cover member 12 to the camera main body 14 may be provided.

Figure 13:
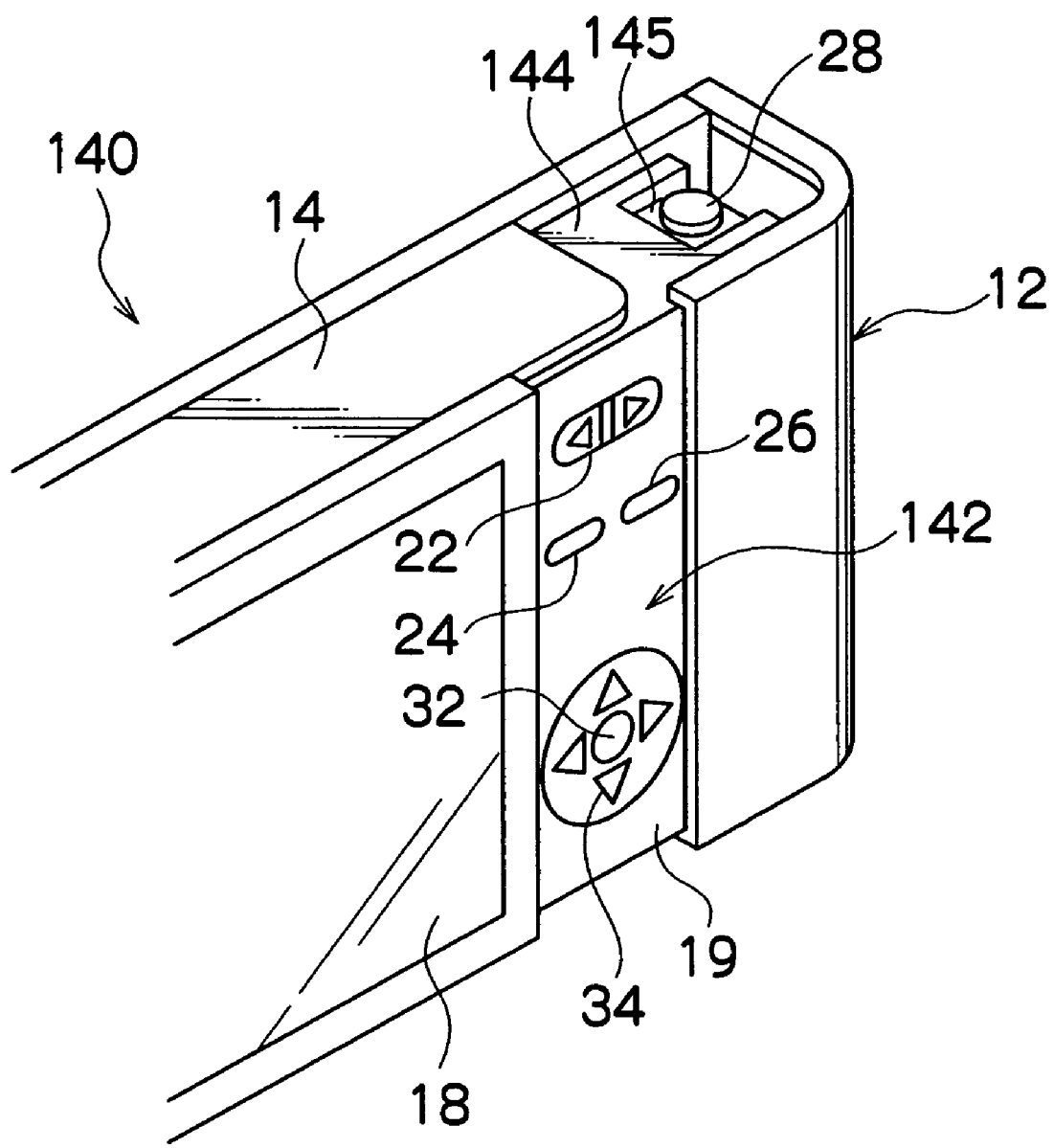
FIG. 13 is a front perspective view of substantial portions of a digital camera according to a fifth embodiment.

FIGS. 13 and 14 are diagrams showing a digital camera 140 according to a sixth embodiment. Same or similar parts to those used in the digital camera 10 shown in FIGS. 1 to 5 are assigned same reference numerals, and descriptions thereof will be omitted.

The digital camera 140 of FIGS. 13 and 14 is configured so that a block body 142, to which a group of operation buttons 22, 24, 26, 32 and 34 are fixed, is configured as a body separate to a camera main body 14, wherein a photography button 28 is arranged in a depressed section 145 formed on an upper face 144 of the block body 142, and the block body 142 is connected to the camera main body 14 via a spring 146, as shown in FIGS. 14A and 14B.

When a cover member 12 is opened, as shown in FIGS. 14A and 14B, the block body 142 reacts to the urging force of the spring 146 and protrudes outward from a housing depressed section 148 of the camera main body 14 to expose the photography button 28 and the group of operation buttons 22, 24, 26, 32 and 34.

When the cover member 12 is slid from its open position shown in FIGS. 13 and 14B towards its closed position shown in FIG. 14A, the cover member 12 moves towards the housing depressed section 148 against the urging force of the spring 146. When the cover member 12 is completely closed, the block body 142 will be housed in the housing depressed section 148 as shown in FIG. 14A, and the entire block body 142 will be covered by the cover member 12 and the camera main body 14.

At this point, while the urging force of the spring 146 acts to apply a force in an opening direction to the cover member 12, by providing friction between the cover member 12 and the camera main body 14 sufficient to resist the urging force, hasty opening of the cover member 12 may be prevented. In addition, when closing the cover member 12, locking members such as a hook, clicking mechanism or the like for locking the cover member 12 to the camera main body 14 may be provided.

While the embodiments have been arranged so that the photography button 28 and the photographic lens 34 are hidden by the cover member 12, embodiments are not limited to this arrangement, and the photography button 28 and the photographic lens 34 may remain exposed during the image playback mode. In addition, while the photography operation members have been used as the operation members to be hidden by the cover member 12 during the image playback mode, embodiments are not limited to this arrangement, and any operation members may be hidden as long as such members are not used during the image playback mode.

What is claimed is:

1. A camera, comprising:
a first assembly;
a photographic lens equipped on the first assembly;
a display section equipped on the first assembly;
operation members equipped on the first assembly;
a second assembly movably provided on the first assembly, and being configured to be movable between a first position at which the operation members are covered and a second position at which the operation members are exposed; and
image playback operation members which function as function buttons related to playback operation while a mode of the camera is set to an image playback mode, the image playback operation members being assigned to operation buttons related to photography while the mode of the camera is set to a photography model
wherein said first assembly comprises a third assembly which is housed in a housing section of the first assembly,
wherein said operation members are fixed to the third assembly,
wherein when the second assembly is moved from the first position to the second position, the third assembly protrudes outward from the housing section along a direction along which the second assembly moves so as to expose the operation members, and
wherein the operation members are housed in a back surface of the display section when the second assembly is at the first position.

2. The camera according to claim 1, wherein the operation members are photography operation members used during photography.

3. The camera according to claim 1, wherein a front face of the photographic lens is covered by the second assembly when the second assembly is at the first position, while
the front face of the photographic lens is exposed when the second assembly is at the second position.

4. The camera according to claim 1, wherein a photography button provided on the first assembly is covered by the second assembly when the second assembly is at the first position, while
the photography button is exposed when the second assembly is at the second position.

5. The camera according to claim 1, wherein said image playback operation members are provided at a position which will not be covered by the second assembly.

6. The camera according to claim 1, wherein when the second assembly moves from the first position to the second position, the power of the camera is turned on, and the mode of the camera is set to the photography mode.

7. The camera according to claim 1, wherein when the second assembly moves from the second position to the first position, the power of the camera is turned off.

8. The camera according to claim 1, further comprising a power switch, and
wherein when the power switch is operated to turn on the power of the camera while the second assembly is at the first position, the mode of the camera is set to the image playback mode.

9. The camera according to claim 2, wherein the camera mode is switched to the image playback mode when the second assembly moves to the first position, and the camera mode is switched to the photography mode when the second assembly moves to the second position.

10. A camera comprising:
a first assembly provided with a display section; and
a second assembly provided with a grip portion, the second assembly being slidably attached to the first assembly, and the second assembly being slidable in a horizontal direction between a closed position and an open position, and
the horizontal width of the camera shortens when the second assembly moved from the open position to the closed position, and the horizontal width of the camera lengthens when the second assembly moved from the closed position to the open position,
the camera further comprising:
a lens section which is covered by the second assembly when the second assembly is at the closed position; and
an operation section which are covered by the first assembly when the second assembly is at the closed position, and the operation section being exposed when the second assembly is at the open position,
wherein the lens section is arranged so as to be exposed to the right side of the first assembly as seen from the front of the camera, and the operation section is arranged so as to be exposed to the grip portion at the right side of the display section on the rear face of the camera, as seen from the rear of the camera, in conjunction with a sliding movement from the closed position to the open position,
wherein the operation section is housed in a back surface of the display section when the second assembly is at the closed position,
wherein said first assembly comprises a third assembly which is housed in a housing section of the first assembly,
wherein said operation section is fixed to the third assembly, and
wherein when the second assembly is moved from the closed position to the open position, the third assembly protrudes outward from the housing section along the horizontal direction of the camera so as to expose the operation section.

11. The camera according to claim 10 wherein when the second assembly is at the open position, the width of the grip portion at the right side of the display section, as seen from the rear of the camera, is expanded.

12. The camera according to claim 10, further comprising a horizontally long display section on a rear face.

13. The camera according to claim 10, wherein when the second assembly moves from the closed position to the open position, the power of the camera is turned on, and a mode of the camera is set to a photography mode.

14. The camera according to claim 10, wherein when the second assembly moves from the open position to the closed position, the power of the camera is turned off.

15. The camera according to claim 10, further comprising a power switch, and
wherein when the power switch is operated to turn on the power of the camera while the second assembly is at the closed position, a mode of the camera is set to an image playback mode.

* * * * *